US008064435B2

(12) United States Patent
Shaikh et al.

(10) Patent No.: US 8,064,435 B2
(45) Date of Patent: Nov. 22, 2011

(54) OPTIMIZED INTERWORKING BETWEEN DIFFERENT COMMUNICATION PROTOCOLS

(75) Inventors: Mohammed Taher Shaikh, Fremont, CA (US); Paul R. P. Chu, Saratoga, CA (US); Sunila R. Ainapure, Sunnyvale, CA (US); Viraj Raut, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 441 days.

(21) Appl. No.: 11/681,081

(22) Filed: Mar. 1, 2007

(65) Prior Publication Data

US 2008/0212594 A1 Sep. 4, 2008

(51) Int. Cl.
*H04L 12/28* (2006.01)
*H04L 12/56* (2006.01)
*H04L 12/66* (2006.01)
*H04J 3/16* (2006.01)
*H04M 11/00* (2006.01)
*G06F 15/16* (2006.01)

(52) U.S. Cl. ..... 370/352; 370/401; 370/467; 379/93.15; 709/228

(58) Field of Classification Search .......... 370/350, 370/384, 385, 401, 282, 352, 466–467; 709/228; 379/93.15
See application file for complete search history.

(56) References Cited

U.S. PATENT DOCUMENTS

| 7,076,048 | B2 * | 7/2006 | Lee et al. ............. 379/265.01 |
| 2007/0058639 | A1 * | 3/2007 | Khan ................. 370/395.52 |
| 2008/0192729 | A1 * | 8/2008 | Kleiner et al. ............. 370/352 |

OTHER PUBLICATIONS

H. Schulzrinne et al., RFC4123—Session Initiation Protocol (SIP)—H.323 Interworking, Jul. 2005, The Internet Society, pp. 1-15.*
Singh et al., Interworking Between SIP/SDP and H.323, Jul. 2000, The Internet Society, pp. 1-37.*
ITU-T Telecommunication Standardization Sector of ITU H.323, Jun. 2006, ITU, pp. 233 and 234.*

* cited by examiner

*Primary Examiner* — Alpus H Hsu
*Assistant Examiner* — Jeremy Costin
(74) *Attorney, Agent, or Firm* — Haynes and Boone, LLP

(57) ABSTRACT

Methods and systems for optimizing interworking between various communication protocols are provided. The method comprises establishing a communication connection between a first endpoint and a second endpoint, wherein the first endpoint communicates over a first communication protocol and wherein the second endpoint communicates over a second communication protocol; and monitoring communication between the first and second endpoints such that communication messages that are transmitted by the first endpoint over the first communication protocol can be mapped to counterpart messages to be received by the second endpoint over the second communication protocol, and communication messages that are transmitted by the second endpoint over the second communication protocol can be mapped to counterpart messages received by the first endpoint over the first communication protocol.

21 Claims, 6 Drawing Sheets

OPTIMIZED INTERWORKING BETWEEN DIFFERENT COMMUNICATION PROTOCOLS

TECHNICAL FIELD

The present invention generally relates to telecommunications and, more particularly, to providing an interworking solution for mapping messages among various communication protocols.

BACKGROUND

Voice over Internet protocol (VOIP) refers to a set of standards for communicating digitized voice in form of data over an IP-based network, such as the Internet. Current VOIP systems use different communication protocols, such as packet based telecommunication protocol H.323 and session initiation protocol (SIP), to set up calls between one or more communication endpoints. Each endpoint (e.g., communication device) may communicate over a different communication protocol, such that one endpoint may communicate over the H.323 protocol and another endpoint may communicate over the SIP, for example.

To support communication between endpoints that use different VOIP protocols, basic models for interworking the H.323 and SIP protocols have been implemented. Interworking refers to the process of mapping a communication method (or message) supported in one protocol to a corresponding or counterpart communication method (or message) in another protocol. Interworking thus provides for establishing a communication connection between two endpoints, even if one endpoint communicates over the H.323 and another endpoint communicates over the SIP, for example.

Unfortunately, not every communication message transmitted over a first VOIP protocol (e.g., H.323) can be mapped to a counterpart message in a second VOIP protocol (e.g., SIP). That is, a one-to-one mapping relationship does not necessarily exist for all messages across different protocols and communication platforms. For example, a 1xx provisional message in the SIP does not have a counterpart in the H.323; or the TCS/MSD message in the H.323 does not have a counterpart in the SIP.

Accordingly, a first message in a first protocol may not be mapped to what would be an equivalent or a corresponding message in a second protocol, if no counterpart for the first message exists in the second protocol. The inability to properly map messages between various protocols results in unreliable interworking and extra processing overhead for gateways and session border controllers (SBC) that provide the interworking capabilities.

For the above reasons, systems and methods are needed that can overcome the aforementioned shortcomings.

BRIEF DESCRIPTION OF THE DRAWINGS

Embodiments of the present invention are understood by referring to the figures in the attached drawings, a brief description of which is provided below.

Features, elements, and aspects of the invention that are referenced by the same numerals in different figures represent the same, equivalent, or similar features, elements, or aspects, in accordance with one or more embodiments.

DESCRIPTION

Overview

Figure 1:
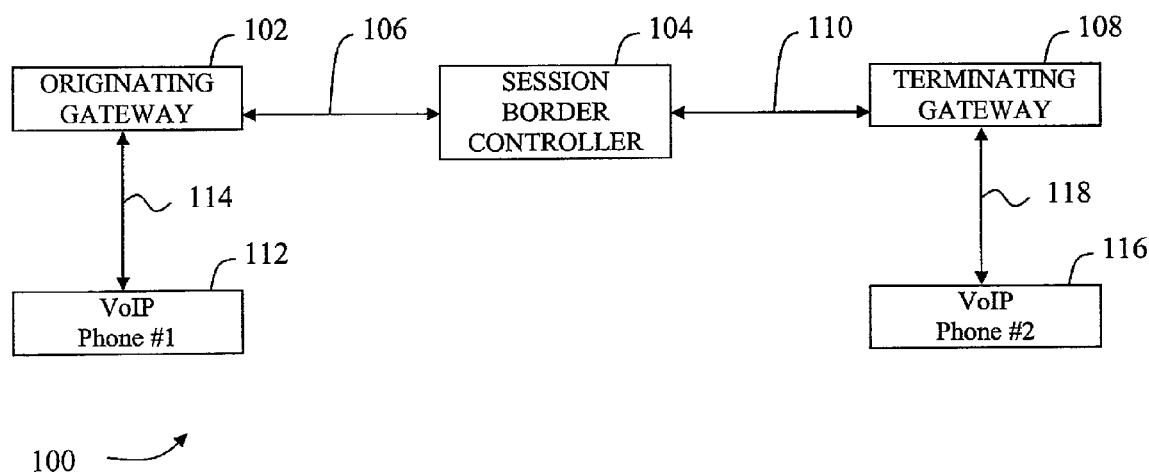
FIG. 1 depicts a simplified block diagram of a communication network in which a plurality of endpoints can communicate, according to one embodiment.

For purposes of summarizing, certain aspects, advantages, and novel features of the invention are provided below. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for optimizing interworking between various communication protocols comprises establishing a communication connection between a first endpoint and a second endpoint, wherein the first endpoint communicates over a first VOIP and wherein the second endpoint communicates over a second VOIP; and providing the second endpoint with information about the first VOIP, such that the second endpoint discontinues sending communication messages over the second VOIP that have no counterparts in the first VOIP.

In some embodiments, the first endpoint is provided with information about the second VOIP, such that the first endpoint discontinues sending communication messages over the first VOIP that have no counterparts in the second VOIP. The first VOIP may be a session initiation protocol (SIP) and the second VOIP may be a packet based communication protocol H.323.

In certain embodiments, information about the first VOIP is provided to the second endpoint by way of embedding first information in a call initiation message transmitted to the second endpoint, and preferably information about the second VOIP is provided to the first endpoint by way of embedding second information in a message generated by the second endpoint in response to the call initiation message.

The communication connection between the first and second endpoints is monitored by at least one of a gateway and a session border controller (SBC) that interworks messages communicated between the first and second endpoints, in accordance with one embodiment. The SBC or the gateway provide the second endpoint with information about the first VOIP and the first endpoint with information about the second VOIP. In accordance with one embodiment, if the endpoints do not discontinue sending incompatible messages, at least one of the SBC or the gateway is configured to block the incompatible messages.

DETAILED DESCRIPTION OF EXAMPLE EMBODIMENTS

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

In accordance with one or more embodiments, systems and methods for mapping messages among various VOIP endpoints are provided. In the following description, several example interworking solutions are provided as applicable to the H.323 and SIP protocols. It is noteworthy, however, that this application is by way of example. Thus, the principals and the teachings of the present disclosure can be equally applied to other communication protocols without detracting from the scope of the invention.

FIG. 1 is an exemplary block diagram of a network 100 configured for VOIP communication, according to one embodiment. Network 100 may comprise an originating gateway 102, a session border controller (SBC) 104, and a terminating gateway 108. SBC 104 may be a network device located in a communication path between the originator of a VOIP call (i.e., a calling party) and the receiver of the VOIP call (i.e., the called party).

In one embodiment, SBC 104 accepts VOIP calls from the calling party and re-originates VOIP calls to the called party. In this manner, SBC 104 may act as, for example, an IP-to-IP gateway for the signaling and media traffic comprising the VOIP call. SBC 104 thus advantageously can support traversal of a firewall or address remapping due to the presence of a Network Address Translator (NAT), in addition to enhanced Quality of Service (QoS) and improved security by providing insulation of core network devices from attacks.

Originating gateway (OG) 102, in one embodiment, communicates with session border controller 104 through a communication path 106 that can include a wired connection or a wireless connection configured to exchanging messages according to a message protocol, such as the Internet Protocol (IP). OG 102 may be considered the source gateway for the VOIP call.

SBC 104 may communicate with terminating gateway 108 through a communication path 110 that can include a wired connection or a wireless connection configured for exchanging messages according to a message protocol. Terminating gateway (TG) 108 may be considered the destination gateway for the VOIP call. In this manner, messages may be passed between OG 102 and TG 108 through SBC 104.

According to one embodiment, a first endpoint (e.g., VOIP phone 112) may communicate with OG 102 through a wired or wireless connection 114 so that a user operating VOIP phone 112 may place or receive a VOIP phone call over network 100. A second endpoint (e.g., VOIP phone 116) may communicate with TG 108 through a wired or wireless connection 118 so that another user operating VOIP phone 116 may receive or place a VOIP phone call over network 100. In this manner, two or more users may communicate with each other over network 100.

In accordance with one or more embodiments, intelligence is added to endpoints (e.g., VOIP phones 112 and 116) or systems that route communication between said endpoints (e.g., OG 102, TG 108, SBC 104 or any functional or structural equivalents thereof) to inform said endpoints and systems about the VOIP protocol over which each endpoint communicates. As provided in more detail below, a first endpoint can use information about the VOIP protocol used by a second endpoint, so the first endpoint does not originate messages that may not be interworked (i.e., properly processed/understood) by the second endpoint.

Figure 2:
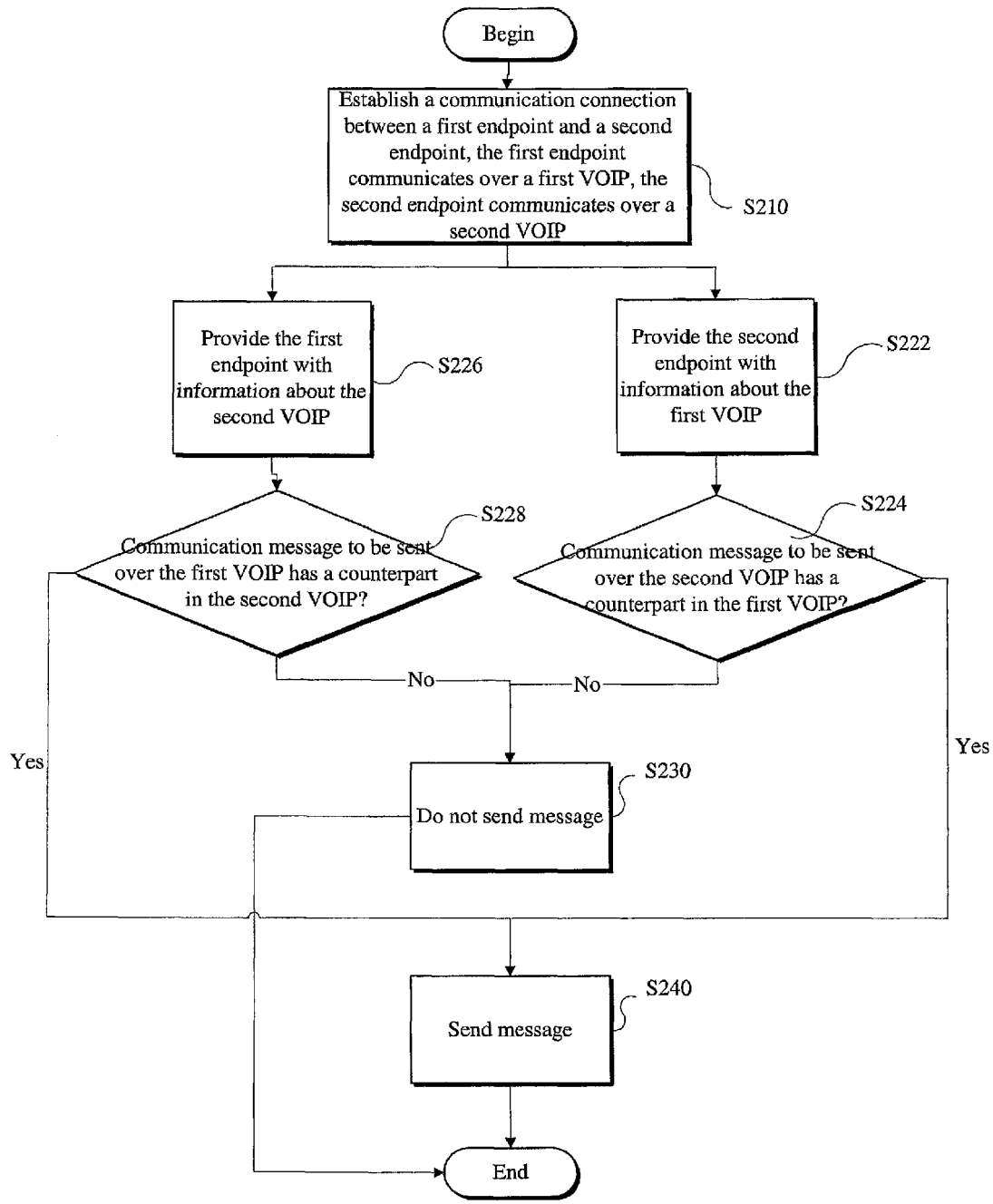
FIG. 2 depicts a simplified flow diagram for a method of optimizing interworking between different communication protocols, according to one embodiment.

Referring to FIG. 2, a method for optimizing interworking between various VOIP endpoints is provided. In one embodiment, a communication connection is established between a first endpoint (e.g., VOIP phone 112) and a second endpoint (e.g., VOIP phone 116), such that the first endpoint communicates over a first VOIP (e.g., SIP) and the second endpoint communicates over a second VOIP (e.g., H.323) (S210).

In accordance with one embodiment, upon initiating a communication session between the first and second endpoints, each endpoint provides the other endpoint with information that identifies the VOIP over which that endpoint communicates (S222, S226). For example, if VOIP phone 112 communicates over the SIP, then the VOIP phone 112 (or OG 102) may provide VOIP phone 116 (or TG 108) with information to indicate that VOIP phone 112 communicates over the SIP.

In a similar manner, if VOIP phone 116 communicates over the H.323, then the VOIP phone 116 (or TG 108) may provide VOIP phone 112 (or OG 102) with information to indicate that VOIP phone 116 communicates over the H.323. To optimize interworking between two endpoints, when either of the VOIP phones 112 or 116 wants to communicate with the other, it is determined whether the communication message that is to be sent over a first VOIP (e.g., SIP) has a counterpart message in a second VOIP (e.g., H.323), and preferably vice versa (S224, S228).

If no counterpart message exists for a message that is to be transmitted from one endpoint to the other, then the message is not sent (S230). If a counterpart message exists, then the message is sent (S240). In some embodiments, an alternate message that has a counterpart is sent instead. For example, if VOIP phone 112 intends to send a message over the SIP that does not have an equivalent counterpart in the H.323, then the message is either not sent or alternatively one or message that perform the same function and have equivalent counterparts in the H.323 are sent instead.

Depending on implementation, the intelligence for not permitting incompatible messages to be sent is either built into the endpoint itself (e.g., VOIP phones 112 or 116) or in the gateways (e.g., OG 102 or TG 108) that manage and rout messages initiated from the endpoint. In alternative embodiments, such intelligence may be built into the SBC 104 either alone or in combination with the other communication components (e.g., gateways, endpoints or functional or structural equivalents thereof) that initiate, terminate, route or manage the communication of messages between endpoints. The intelligence may be based on embedding or retrieving information included in known portions (e.g., header sections) of messages being communicated between the endpoints during or after the call is initiated.

In accordance with one embodiment, when VOIP phone 116 is sending a message over the H.323 that does not have a counterpart in the H.323, the message is not sent as provided above. Removing incompatible messages from the communication scheme allows for interworking between endpoints to be seamless and efficient. Advantageously, this approach reduces resource utilization and call setup time for the systems that control and manage the interworking (e.g., SBCs, call agents, etc.).

In the following, certain exemplary message flows for various exemplary communication protocols are disclosed as applicable to one or more embodiments. It is noteworthy, however, that the following detailed embodiments are provided by way of example and should not be construed as limiting the scope of the invention to such exemplary embodiments.

Figure 3:
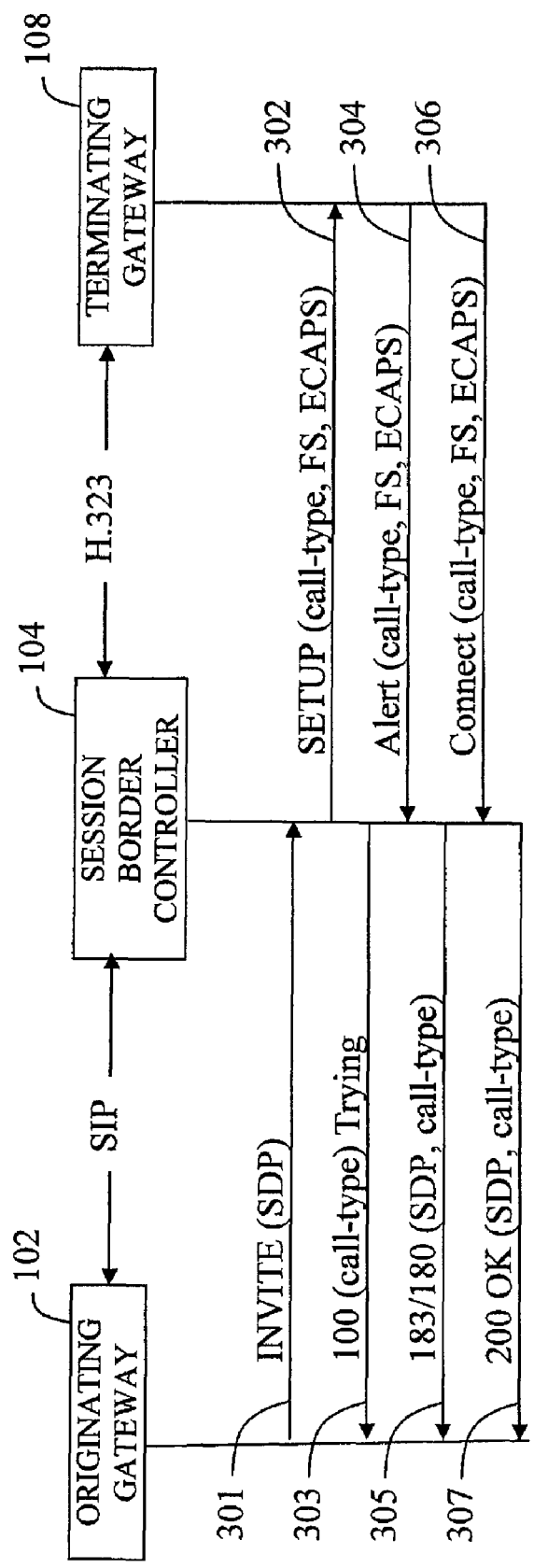
FIGS. 3 and 4 depict exemplary methods for establishing a voice call between SIP and H.323 supported endpoints, according to one or more embodiments.

Referring to FIG. 3, an exemplary method 300 for communicating early media between SIP and H.323 supported endpoints is provided, using a fast start initiation scheme. As shown, a first endpoint may send, by way of OG 102, an INVITE message over the SIP (301). Preferably, the message comprises session description protocol (SDP) parameters that include information about codec capability, DTMF type, and other communication related parameters.

SDP is used to handle the session negotiation process within a SIP supported communication. In one embodiment, a SDP packet is carried as the message body of the SIP INVITE request. As part of the SIP INVITE request, an SDP offer is made, detailing a number of characteristics that define the parameters for a proposed session, such as codec type, contact information and ports to be used. The response to the request, acknowledges acceptance, or offers alternative session parameters, or declines the proposed session with no alternatives offered.

In one embodiment, SBC 104 receives the SIP INVITE message and maps it to a H.323 SETUP message which carries fields such as call-type, (FS), and extended capability set (ECAPS) (302). Said fields define codec capabilities of the first endpoint to the second endpoint via TG 108. Including the call-type and ECAPS fields in the SETUP message saves approximately six to eight message exchanges and one socket per call because DTMF, T.38 and other extended capabilities are not exchanged as a part of the SETUP message in H.323. Preferably, such parameters are exchanged later using a terminal capability set master slave determination (TCS/MSD) procedure.

In an example interworking scenario between SIP and H.323, a TCS/MSD message will cause for the exchange of at least an additional six to eight messages between SBC 104 and TG 108. Advantageously, in one embodiment SBC 104 and TG 108 avoid the TCS/MSD procedures and pass the extended capabilities as embedded in the ECAPS parameter as part of the SETUP message along with call-type. As such, extra H.245 channels are not opened to communicate a TCS/MSD message. In alternate embodiments, the TCS/MSD message is transmitted over an H.225 tunnel.

In one embodiment, SBC 104 transmits a 100 Trying message to the first endpoint via OG 102 over the SIP with a call-type to indicate that the second endpoint communicates over H.323 (303). TG 108, based on the call-type and other parameters included in the SETUP message, replies by sending an ECAPS either in an alert or a progress message (304), for example. Preferably, TG 108 avoids sending incompatible H.323 responses (e.g., SETUPACK, CALLPROC, etc.) which are not mapped to a counterpart message in SIP.

SBC 104 transmits to OG 102, over the SIP, a 183/180 message with SDP and call-type (S305). The 183/180 message provides progress or ringing status information, for example. OG 102 preferably avoids sending SIP PRACK or other provisional responses to SBC 104, once it receives the 183/180 message with SDP, because SIP PRACK or other provisional SIP 1xx responses cannot be interworked to counterpart H.323 messages. Preferably, SBC 104 fine-tunes the timers that depend on provisional response times to avoid initiating the provisional responses.

In one embodiment, TG 108 sends a connect message to SBC 104 over H.323 (306). Preferably, the second endpoint replies with a TCS/MSD message over the H.323 after the connect message. In accordance with one embodiment, for inter-working calls, a H.245 address is not transmitted, because it would result in initiation of a TCS/MSD message which does not have a counterpart messages in SIP.

In accordance with one or more embodiments, SBC 104 sends a response 200 OK message over SIP to OG 102 (307). Accordingly, a voice call is established between the first and second endpoints by way of interworking SIP and H.323 messages via OG 102, SBC 104 and TG 108, for example. To tear down the call, TG 108 can send a H.323 release complete message which can be mapped to an SIP bye message. TG 108 and SBC 104 preferably avoid sending end session messages followed by close local channel (CLC) command because such messages do not have a counterpart in SIP.

Figure 4:
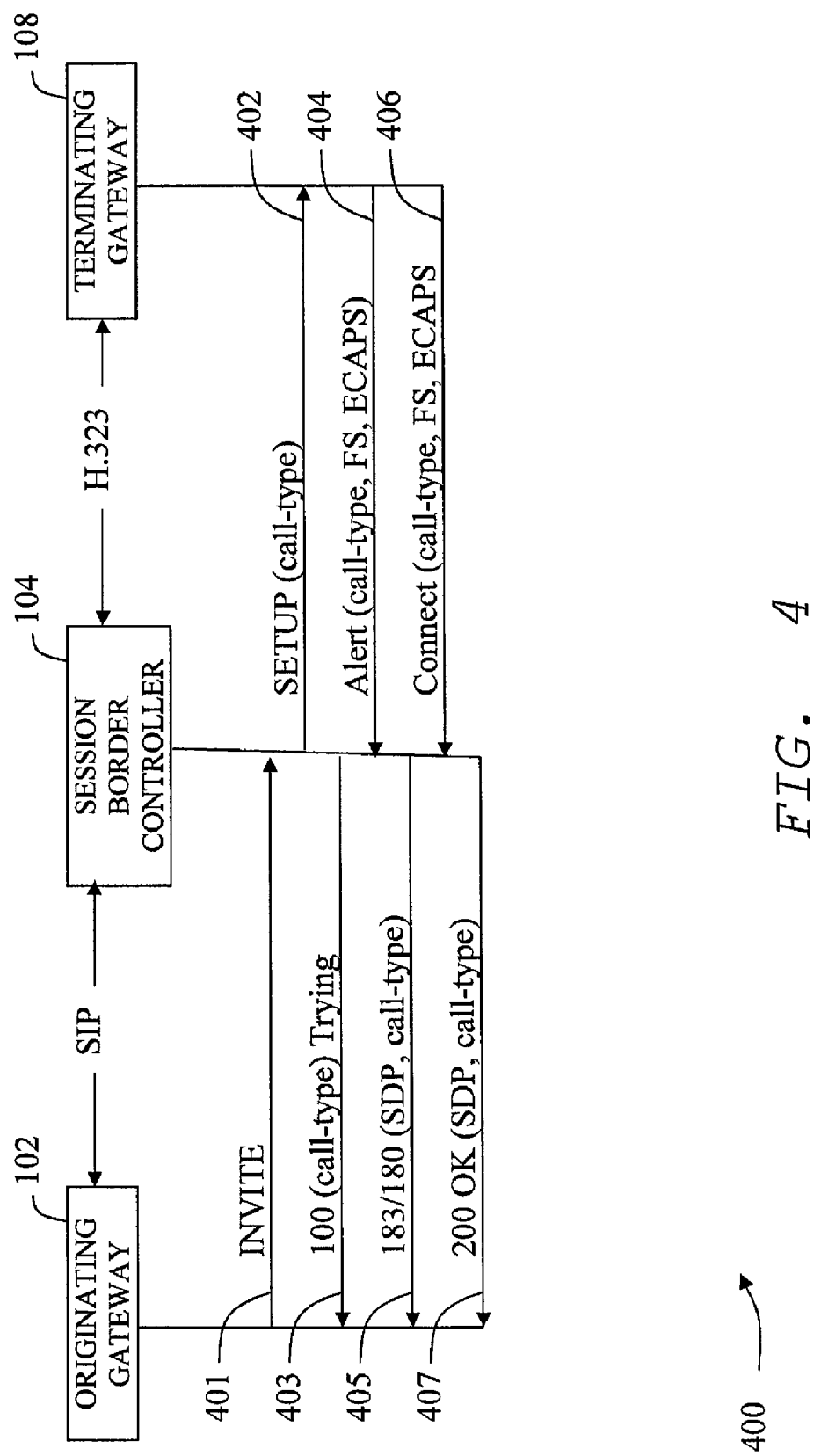

Referring to FIG. 4, an exemplary method 400 for communicating delayed media between SIP and H.323 supported endpoints is provided, using a slow start initiation scheme. In this embodiment, an SIP INVITE message is sent from OG 102 to SBC 104 with no SDP (401). SBC 104 sends a SETUP message to TG 108 with call-type (402). SBC 104 sends a 100 Trying message with call-type (403). TG 108 sends a response back to SBC 104 preferably by way of an Alert or a Progress message with FS, call-type and ECAPS parameters, for example (404).

SBC 104 transmits to OG 102, over the SIP, a 183/180 message with SDP and call-type (S405). In one embodiment, TG 108 sends a connect message to SBC 104 over H.323 (406). Preferably, the second endpoint sends a TCS/MSD message over the H.323 after the connect message. In accordance with one embodiment, for inter-working calls, a H.245 address is not transmitted, because it would result in initiation of a TCS/MSD message which does not have a counterpart messages in SIP.

In accordance with one or more embodiments, SBC 104 sends a response 200 OK message over SIP to OG 102 (407). Accordingly, a voice call is established between the first and second endpoints by way of interworking SIP and H.323 messages via OG 102, SBC 104 and TG 108. Advantageously, using the above messaging scheme, there will be no need for establishing a separate communication tunnel for exchanging H.245 messages or exchanging TCS/MSD/OLC messages before a connection is established.

In one embodiment, about six to eight message exchanges are eliminated and an additional channel (i.e., port) for H.245 is saved, for example. The above implementation will also reduce call establishment time. For tearing down the connection, TG 108 can send a H.323 release complete message which can be mapped to an SIP bye message. TG 108 and SBC 104 preferably avoid sending an H.323 end session message followed by a CLC command, because there are no counterpart messages in the SIP.

As noted earlier, in one embodiment, if the gateways or endpoints involved in the communication are not implemented to support the above scheme and continue to send messages that do not have a counterpart in the other VOIP, SBC 104 may be configured to intercept illegal messages. For the purpose of this disclosure, illegal messages are considered to be messages in a first VOIP that do not have a functional equivalent or counterpart in a second VOIP.

In certain embodiments, SBC 104 preferably blocks the following exemplary messages to help interwork messages efficiently: (1) TCS and TCS/MSD messages, unless otherwise needed; (2) messages related to calls that are unique to SIP; (3) messages related to overlap signaling which are unique in H.323; (4) messages such as H.323 end session followed by CLC command which do not have a counterpart in SIP.

It is important to emphasize that the above embodiments and messages are provided by way of example as applicable to H.323 and SIP communication protocols. Accordingly, the scope of the invention should not be construed as limited to the above exemplary embodiments. The concepts and principals disclosed herein may be equally applicable to other communication protocols, interworking schemes and messaging features.

Figure 5:
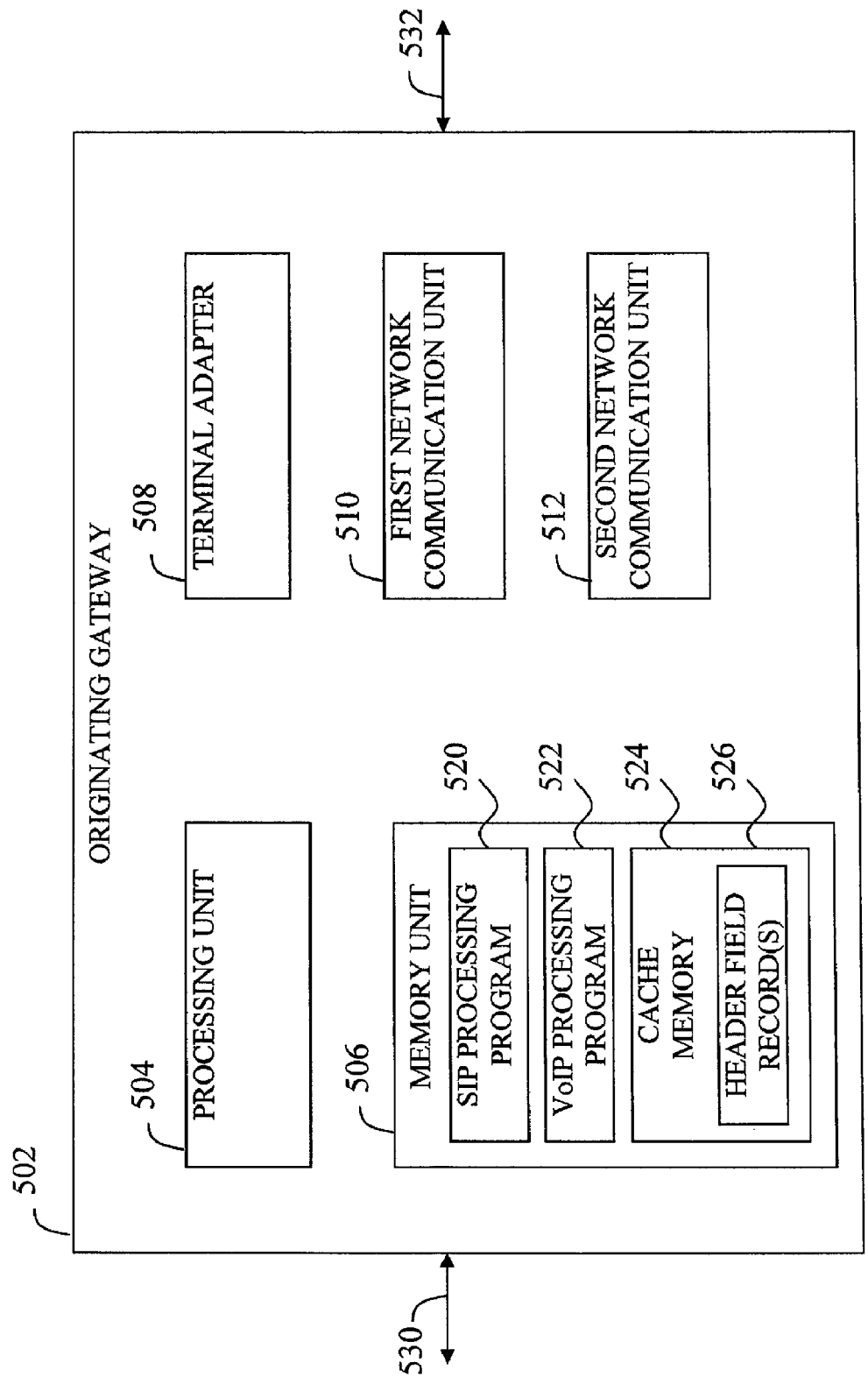
FIG. 5 is a simplified block diagram of exemplary components of a gateway, according to one embodiment.

FIG. 5 is an exemplary block diagram of an originating gateway (OG) 502, according to one embodiment. OG 502 is a particular embodiment of OG 102 shown in FIG. 1 and may include a processing unit 504, a memory unit 506, a terminal adapter 508, a first communication unit 510 or a second communication unit 512. Processing unit 504 may comprise a computer processor configured to fetch, decode and execute instructions in one or more computer programs.

Memory unit 506 may include one or more memory devices configured to store and retrieve information including a Random Access Memory (RAM), a Read Only Memory (ROM), a cache memory, a content addressable memory (CAM), and/or a register file. Memory unit 506 may include magnetic, optical, and/or electronic storage and retrieval technologies, and may store programs including an SIP processing program 520, and/or a VOIP processing program 522.

SIP processing program 520 may be included in a computer readable medium on which is stored one or more computer instructions for operations related to one or more embodiments of the present invention. Similarly, VOIP processing program 522 may include computer instructions for operations related to placing and receiving VOIP telephone calls. In one example, when a user lifts a VOIP telephone receiver, processing unit 504 running a VOIP processing program 522 detects the lifting of the receiver and provides a dial tone into the VOIP earpiece, or provides another indicator that the VOIP phone is ready for use in placing a call.

Processing unit 504 may fetch, decode and execute computer instructions in order to carry out operations. Memory unit 506 may include a cache memory 524 configured to store and retrieve information including discrete data individually or related data in one or more data records, including one or more header field records 526. Message header information may be stored discretely as individual data elements, and transformed according to instructions in SIP processing program 520 into one or more data records for direct inclusion into an outbound message header.

Terminal adapter 508 may translate between signal types or protocols to provide communication between various user devices over various communication channels. For example, terminal adapter 508 may translate between message packet information and a VOIP telephone handset, a video display, and/or any user interface, including a transition to a wireless Local Area Network (LAN).

Briefly with reference to FIG. 1, terminal adapter 508 may provide an interface between VOIP phone 112 and OG 102 by translating some portion of the information between communication path 106 and communication path 114. First network communication unit 510 may provide communication between OG 502 and a first network 530, while second network communication unit 512 may provide communication between OG 502 and a second network 532.

In one embodiment, first network 530 may comprise a local area network (LAN) at a first level of network hierarchy, and second network 532 may comprise a wide area network (WAN) at a second level of network hierarchy. Preferably, OG 502 routes traffic between the first network 530 and second network 532, in accordance with one or more embodiments.

Figure 6:
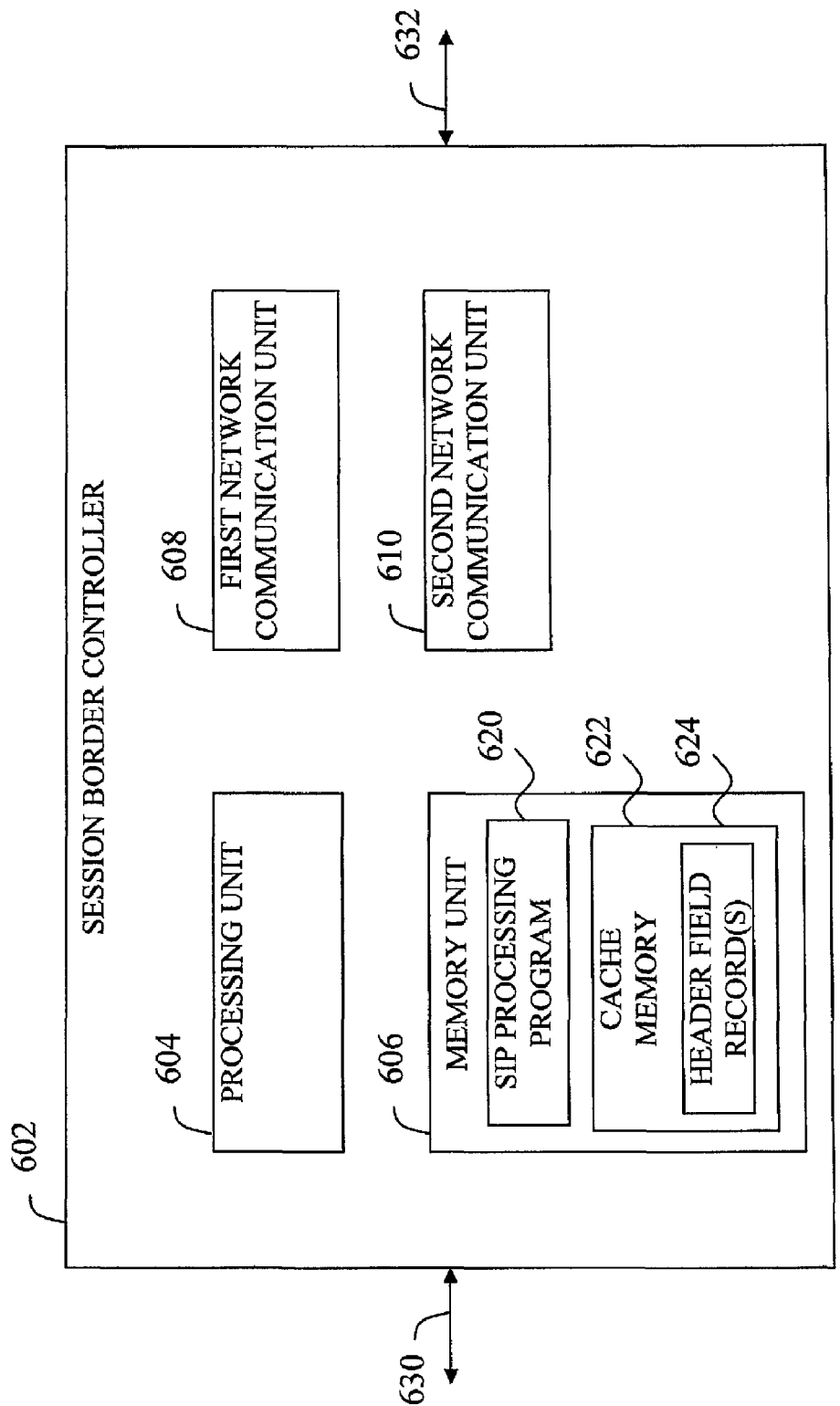
FIG. 6 is a simplified block diagram of exemplary components of a SBC, according to one embodiment.

FIG. 6 illustrates an exemplary block diagram of a SBC 602, according to one embodiment. SBC 602 is an exemplary embodiment of SBC 104 shown in FIG. 1 and may comprise a processing unit 604, a memory unit 606, a first network communication unit 608 and a second network communication unit 610. Processing unit 604 may include a computer processor configured to fetch, decode and execute instructions in one or more computer programs.

Memory unit 606 may include one or more memory devices configured to store and retrieve information including a Random Access Memory (RAM), a Read Only Memory (ROM), a cache memory, a content addressable memory (CAM), and/or a register file. Memory unit 606 may include magnetic, optical and/or electronic storage and retrieval technologies, and may store programs including an SIP processing program 620. SIP processing program 620 may be included in a computer readable medium on which is stored one or more computer instructions for operations related to one or more embodiments of the present invention.

Processing unit 604 may fetch, decode and execute these and/or other computer instructions in order to carry out operations related to one or more embodiments of the present invention. Memory unit 606 may also include a cache memory 622 configured to store and retrieve information including discrete data individually and/or related data in one or more data records, including one or more header field records 624. Message header information may be stored discretely as individual data elements, and transformed according to instructions in SIP processing program 620 into one or more data records for direct inclusion into an outbound message header.

In one embodiment, first network communication unit 608 may provide communication between SBC 602 and a first network 630, while second network communication unit 610 may provide communication between SBC 602 and a second network 632. SBC 602 may be located in a communication path between the originator of a VOIP call (i.e., calling party) and the receiver of the VOIP call, (i.e., called party) so that SBC 602 can intercept the VOIP call, purportedly as the called party, and place another call to the actual called party. In accordance with one embodiment, SBC 602 acts as an IP-to-IP gateway for both signaling and media traffic comprising the VOIP call.

Although the invention has been described with respect to specific exemplary embodiments, these exemplary embodiments are merely illustrative and not restrictive of the invention. For example, the principals and conventions disclosed herein may be used for interworking messages between communication protocols other than SIP and H.323.

Any suitable programming language can be used to implement the processes, steps, or routines discussed with reference to the above exemplary embodiments. Such programming languages may include C, C++, Java, assembly language, etc. Different programming techniques (e.g., procedural or object oriented) may be employed. The routines can be executed on a single processing device or multiple processors. Although certain steps, operations or computations may have been presented in a specific order in the above exemplary embodiments, this order is not of particular importance unless stated otherwise.

For example, in some embodiments of the invention, multiple steps in a process are shown as sequential. However, in alternative embodiments, such steps may be performed concurrently or in a different sequence. The sequence of operations described herein can be interrupted, suspended or otherwise controlled by another process, such as an operating system, a kernel, a virtual machine, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

Numerous specific details have been provided, such as examples of components and methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials or operations are not specifically shown or described in detail to avoid obscuring aspects of embodiments of the present invention.

A "computer-readable medium" for purposes of embodiments of the present invention may be any medium that can contain, store, communicate, propagate or transport the program for use by or in connection with the instruction execution system, apparatus, system or device. The computer readable medium can be, by way of example, an electronic, magnetic, optical, electromagnetic, infrared, or semiconductor system, apparatus, system, device, propagation medium or computer memory.

Certain embodiments of the present invention can be implemented in the form of control logic in software or hardware or a combination of both. The control logic may be stored in an information storage medium, such as a computer-readable medium, as a plurality of instructions adapted to direct an information processing device to perform a set of steps as disclosed in one or more embodiments. Based on the disclosure and teachings provided here, a person of ordinary skill in the art will appreciate that other ways and/or methods may be implemented to accomplish the same or similar results as contemplated herein.

A "processor" or "process," as used herein may comprise any human, hardware and/or software system, mechanism or component that processes data, signals or other information. A processor can include a system with a general-purpose central processing unit, multiple processing units, dedicated circuitry for achieving functionality or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems, for example.

References throughout this specification to "one embodiment," "an embodiment," or "a specific embodiment" mean that a particular feature, structure or characteristic described in connection with the embodiment is included in at least one embodiment of the present invention and not necessarily in all embodiments. Thus, respective appearances of the phrases "in one embodiment," "in an embodiment," or "in a specific embodiment" in various places throughout this specification are not necessarily referring to the same embodiment.

Furthermore, the particular features, structures or characteristics of any specific embodiment of the present invention may be combined in any suitable manner with one or more other embodiments. It is to be understood that other variations and modifications of the embodiments described and illustrated herein are possible in light of the teachings herein and are to be considered as part of the spirit and scope of the present invention.

One or more embodiments may be implemented by using a programmed general-purpose digital computer, by using application specific integrated circuits, programmable logic devices, field programmable gate arrays, optical, chemical, biological, quantum or nanoengineered systems, components and mechanisms. In general, the disclosed functions can be achieved by any means as is known in the art. Distributed or networked systems, components and circuits can be used to implement one or more embodiments. Communication or transfer of data may be accomplished over wired or wireless communication lines, or by any other means.

It also will be appreciated that one or more of the elements depicted in the drawings can also be implemented in more or less detail, or even removed or rendered as inoperable in certain cases, as is useful in accordance with a particular application. It is also within the spirit and scope of the invention to implement a program or code that can be stored in a machine-readable medium to permit a computer to perform any of the methods described above.

Additionally, any signals in the drawings should be considered as exemplary, and not limiting, unless otherwise specifically noted. Furthermore, the term "or" as used herein is generally intended to be non-exclusive to mean "and/or," unless otherwise indicated. Combinations of components or steps will also be considered as being noted, where terminology is foreseen as rendering the ability to separate or combine is unclear.

While the present invention has been described herein with reference to particular embodiments thereof, a latitude of modification, various changes and substitutions are intended in the foregoing disclosures, and it will be appreciated that in some instances some features of certain embodiments will be employed without a corresponding use of other features and without departing from the scope and spirit of the invention as set forth. Therefore, some modifications may be made to adapt a particular situation or material to the essential scope and spirit of the invention.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A method of interworking a communication connection between a SIP (Session Initiation Protocol) endpoint and an H.323 endpoint, wherein the SIP endpoint is a first voice over internet protocol (VOIP) phone device separate from a session border controller device performing interworking and communicates over a first VOIP; and wherein the H.323 endpoint is a second VOIP phone device separate from the session border controller device and communicates over a second VOIP, the method comprising:

determining, by the second VOIP phone device, using an extended capabilities set field embedded in an H.323 message sent to the H.323 endpoint, whether a communication message of the second VOIP has a counterpart in the first VOIP, wherein the extended capabilities set field includes a first VOIP identifying indication, provided from the first VOIP phone device, that indicates what VOIP the SIP endpoint communicates over; and discontinuing sending, by the second VOIP phone device, the communication message of the second VOIP, if the communication message of the second VOIP has no counterpart in the first VOIP, wherein a terminal capability set (TCS) message and a TCS master-slave determination (TCS/MSD) message are not sent and the session border controller device avoids TCS/MSD procedures.

2. The method of claim 1, further comprising discontinuing sending, by the SIP endpoint, a communication message of the first VOIP, if the communication message of the first VOIP has no counterpart in the second VOIP.

3. The method of claim 1, wherein the discontinuing is performed in response to the SIP endpoint receiving information about the second VOIP.

4. The method of claim 1, wherein the discontinuing is performed in response to the H.323 endpoint receiving information about the first VOIP.

5. The method of claim 1, wherein the first VOIP is a session initiation protocol (SIP).

6. The method of claim 1, wherein the second VOIP is a packet based communication protocol H.323.

7. The method of claim 3, wherein the information about the second VOIP is provided to the SIP endpoint by way of embedding second information in a message generated by the H.323 endpoint in response to a call initiation message.

8. The method of claim 4, wherein the communication connection between the SIP endpoint and H.323 endpoint is monitored by a session border controller (SBC) that interworks messages communicated between the SIP endpoint and H.323 endpoint.

9. The method of claim 8, wherein the SBC provides the H.323 endpoint with information about the first VOIP.

10. The method of claim 4, wherein the information about the first VOIP comprises data indicating type of communication protocol utilized by the first VOIP.

11. A system comprising:
a session border controller (SBC) which establishes a communication connection between a SIP endpoint and an H.323 endpoint, wherein the SIP endpoint is a first voice over internet protocol (VOIP) phone device separate from the SBC performing interworking and communicates over a first VOIP and wherein the H.323 endpoint is a second VOIP phone device separate from the the SBC and communicates over a second VOIP;
a terminating gateway which provides the H.323 endpoint with information identifying the first VOIP, such that the second VOIP phone device:
determines, using an extended capabilities set field embedded in an H.323 message sent to the H.323 endpoint, whether a communication message of the second VOIP has a counterpart in the first VOIP, wherein the extended capabilities set field includes a first VOIP identifying indication, provided from the first VOIP phone device, that indicates what VOIP the SIP endpoint communicates over; and discontinues sending the communication message, over the second VOIP, if the communication message of the second VOIP has no counterpart in the first VOIP, wherein a terminal capability set (TCS) message and a TCS master-slave determination (TCS/MSD) message are not sent and the SBC avoids TCS/MSD procedures.

12. The system of claim 11, further comprising an originating gateway which provides the SIP endpoint with information about the second VOIP, such the SIP endpoint discontinues sending communication messages over the first VOIP that have no counterparts in the second VOIP.

13. The system of claim 11, wherein the first VOIP is a session initiation protocol (SIP).

14. The system of claim 11, wherein the second VOIP is a packet based communication protocol H.323.

15. The system of claim 11, wherein information about the first VOIP is provided to the H.323 endpoint by way of embedding first information in a call initiation message transmitted to the H.323 endpoint.

16. The system of claim 15, wherein information about the second VOIP is provided to the SIP endpoint by way of embedding second information in a message generated by the H.323 endpoint in response to the call initiation message.

17. The system of claim 11, wherein the communication connection between the SIP endpoint and H.323 endpoint is monitored by the SBC that interworks messages communicated between the SIP endpoint and H.323 endpoint.

18. The system of claim 17, wherein the SBC provides the H.323 endpoint with information about the first VOIP.

19. The system of claim 17, wherein the SBC provides the SIP endpoint with information about the second VOIP.

20. A method of managing a communication connection between a SIP endpoint and an H.323 endpoint, wherein the SIP endpoint is a first voice over internet protocol (VOIP) phone device separate from a session border controller device performing interworking and communicates over a first communication protocol and wherein the H.323 endpoint is a second VOIP phone device separate from the session border controller device and communicates over a second communication protocol, the method comprising:
receiving by the first VOIP phone device an extended capabilities set field embedded in a received message of the first VOW sent to the SIP endpoint, wherein the extended capabilities set field includes an indication identifying the second communication protocol, provided from the second VOIP phone device, that indicates what VOIP the H.323 endpoint communicates over, such that communication messages that are transmitted by the first VOIP phone device over the first communication protocol can be mapped to counterpart messages to be received by the second VOIP phone device over the second communication protocol, wherein:
the first VOIP phone device determines, using the extended capabilities set field whether a message of the first communication protocol can be mapped to counterpart messages to be received by the second VOIP phone device over the second communication protocol and does not transmit the message of the first communication protocol if the message of the first communication protocol cannot be mapped to a counterpart message of the second communication protocol,
so that communication messages that cannot be mapped to counterpart messages are not transmitted by the first VOIP phone device, and a terminal capability set (TCS) message and a TCS master-slave determination (TCS/MSD) message are not sent and the session border controller device avoids TCS/MSD procedures.

21. A method comprising:
establishing a communication connection between a SIP endpoint and an H.323 endpoint, wherein the SIP endpoint is a first voice over internet protocol (VOIP) phone device separate from a session border controller device performing interworking and communicates over a first VOIP and wherein the H.323 endpoint is a second VOIP phone device separate from the session border controller device and communicates over a second VOIP; and
managing messages between the SIP endpoint and H.323 endpoint,
wherein the second VOIP phone device discontinues sending to the SIP endpoint a communication message of the second VOIP if the second VOIP phone device has determined from an indication identifying the first VOIP being used by the SIP endpoint, wherein the indication is included in an extended capabilities set field embedded in an H.323 message sent to the H.323 endpoint, wherein indication is provided from the first VOIP phone device, and wherein the indication indicates what VOIP the SIP endpoint communicates over, that the communication message of the second VOIP has no counterpart in the first VOIP, and wherein a terminal capability set (TCS) message and a TCS master-slave determination (TCS/MSD) message are not sent and the session border controller device avoids TCS/MSD procedures.

* * * * *